United States Patent [19]

Jagers

[11] 4,054,072

[45] Oct. 18, 1977

[54] MACHINE FOR THE COLD-SAWING OF STEEL PLATES WITH HORIZONTAL FEED MOVEMENT

[76] Inventor: Leopold Jagers, Rudolf-Diesel-Str. 1, 5350 Euskirchen, Rhineland, Germany

[21] Appl. No.: 618,616

[22] Filed: Oct. 1, 1975

[30] Foreign Application Priority Data

Oct. 3, 1974 Germany ................ 2447147

[51] Int. Cl.² .......................... B23D 45/02
[52] U.S. Cl. .................. 83/488; 83/471.2; 83/485; 30/371
[58] Field of Search ............ 83/488, 485, 471.2; 30/371, 273

[56] References Cited

U.S. PATENT DOCUMENTS

| | | | |
|---|---|---|---|
| 1,767,012 | 6/1930 | Pfau | 83/471.2 |
| 3,091,851 | 6/1963 | Cummins | 30/371 |
| 3,092,156 | 6/1963 | Hayden | 30/371 |
| 3,213,907 | 10/1965 | Pappas | 83/488 |
| 3,566,932 | 3/1971 | Papenmeier | 83/471.2 |
| 3,839,789 | 10/1974 | Valkosky | 30/273 |

*Primary Examiner*—Donald R. Schran
*Attorney, Agent, or Firm*—Haseltine, Lake & Waters

[57] ABSTRACT

A machine for the cold-sawing of steel plates in which the feed movement between the circular saw blade including its drive housing and the workpiece, in essence the steel plate, is effectuated in a horizontal direction. The saw unit, which consists of the saw blade and its drive housing is so guided in a vertical direction as to be freely movable in this direction, and is provided with means which support themselves on the workpiece in immediate proximity to the saw cut in a manner whereby the saw blade does not enter essentially deeper into the workpiece than would be necessary to divide the latter. During sawing, the saw blade should project beyond the lower surface of the workpiece by only a fraction of a millimeter.

5 Claims, 8 Drawing Figures

MACHINE FOR THE COLD-SAWING OF STEEL PLATES WITH HORIZONTAL FEED MOVEMENT

FIELD OF THE INVENTION

The present invention relates to a machine for the cold-sawing of steel plates in which the feed movement between the circular saw blade including its drive housing and the workpiece, in essence the steel plate, is effectuated in a horizontal direction.

In saws of this type, when the steel plate which is to be sawed evidences considerable stresses which are released during the through sawing, the saw blade is clamped with such a force between the two portions of the plate which are divided by the saw so that the saw blade is brought to a standstill, with the steel plate being cold-welded or fractured.

DISCUSSION OF THE PRIOR ART

It has been ascertained that the disadvantageous effect is created in that a relatively large distance is provided between the locations of the saw blade at which it enters into the steel plate and from which it exits therefrom, then thereby can the forces, which are released through the separation of the steel plate, clamp the saw blade with a large force at the location at which it exits from the steel plate.

SUMMARY OF THE INVENTION

Accordingly, it is an object of the present invention to provide an arrangement which is adapted to prevent such a clamping of the circular saw blade.

The inventive concept for the achievement of this task is predicated on the knowledge that the forces which are exerted on the saw blade from the steel plate due to its internal stresses, will first show a magnitude influencing the power output of the machine and the saw blade when there is provided between the location at which the saw blade exits from the steel plate which is being sawed, in essence the workpiece, a large distance to the location at which the workpiece is cut through or separated by the saw blade, and wherein these forces can be maintained sufficiently low when this distance is maintained sufficiently small.

According to the present invention, the foregoing object is achieved in that the saw unit, which consists of the saw blade and its drive housing is so guided in a vertical direction as to be freely movable in this direction, and is provided with means which support themselves on the workpiece in immediate proximity to the saw cut in a manner whereby the saw blade does not enter essentially deeper into the workpiece than would be necessary to divide the latter. During sawing, the saw blade should project beyond the lower surface of the workpiece by only a fraction of a millimeter. This is in a particular measure of significance for saw blades with inserted teeth, which are constituted of a harder material, such as carbide, inasmuch as due to the arrangement pursuant to the invention, the breaking of such teeth is prevented.

The support means of the saw unit may consist of rolls or pressure guides which extend along the upper surface of the workpiece and are rigidly connected with the saw unit. Preferably, the support means are adjustable in a vertical direction with respect to the saw unit, and/or the saw unit with respect to the machine frame, so as to render it possible to saw workpieces of different thicknesses and to facilitate the use of saws having different diameters.

The support means may be arranged on both sides of the saw blade, preferably below the axis of the saw blade, or between this location and the location at which the saw blade exits from the workpiece.

Preferably, one support means which is rigidly connected with the saw unit is arranged closely ahead of the location at which the saw blade penetrates into the workpiece, and a second support means which is rigidly connected with the saw unit is arranged closely located behind the location at which the saw blade exits from the workpiece. For the vertical adjustment of these workpieces, each of these support means may be supported so as to be adjustable on a guide which is inclined to the vertical.

Preferably, the saw unit, which is constituted of the saw blade and drive, is guided in a vertical direction on a carriage, the latter of which is horizontally displaceable with respect to the machine frame.

The above-mentioned support means may be so utilized, with their end members being rigidly interconnected, and pairwise fixedly adjustably lying against both sides of the saw blade, in order to guide the saw blade in its vertical plane.

BRIEF DESCRIPTION OF THE DRAWINGS

Further advantages and details of the invention may now be ascertained from the following description thereof, taken in conjunction with the accompanying drawings; in which.

DETAILED DESCRIPTION

The sawing machine which is illustrated in FIGS. 1 through 7 of the drawings possesses a horizontal foundation 1, carrying a workpiece support or table plate constituted of two parts 3a and 3b, which are located in alignment and are separated from each other by means of a gap 4. Located at the head ends of the table plate 3a and 3b are vertical supports 2a and 2b on which there are fastened two mutually parallel horizontal support beams 5 and 25. The beam 5 possesses vertically superimposed horizontal guide rails 5a and 5b for the guide grooves 6a and 6b of a carriage 6, the latter of which is connected with a vertical column 13 having an essentially rectangular cross-section. At its upper end the column 13 carries a plate 16 with a vertically extending cylinder 17 which has a piston 18 therein hydraulically up-and-down reciprocable, and whose piston rod 19 is supported against the upper surface of the carriage 6. Thus, through movement of the piston 18, the column 13 together with its guide rails 20a and 20b, can be moved up-and-down along the guide grooves 6e, 6d of the carriage 6. At its lower end of the column 13 carries the drive housing 14 for the circular blade 15. Furthermore, somewhat above the circular blade 15, the column 13 carries on each side thereof a crosspiece 21a, respectively 21b. Each of these crosspieces 21a, 21b is provided with a guide at an edge which is inclined 45° with regard to the vertical, and which is encompassed by the dove-tail guide of a carrier 22a, respectively, 22b, so as to be displaceable along this guide at an angle of 45° to the vertical. The carriers 22a and 22b are adapted to be fixed opposite the cross carriers 21a, respectively, 21b.

Each of the carriers 22a and 22b supports a roller 23a, respectively 23b at its lower end. Through displacement of the carriers 22a, 22b, which support the rollers 23a and 23b, along the guidance path of the crosspieces 21a, 21b, the saw unit which encompasses the saw blade 15 and its drive may be so displaced with respect to the workpiece W, so that, at each thickness of the workpiece W, it only projects a small amount into the gap 4 between the parts 3a and 3b of the workpiece table plate. (refer to FIGS. 6 and 7 of the drawings).

The lower end of each of the carriers 22a and 22b further supports a pair of end members 24a, respectively, 24b for the precise guidance of the circular blade 15 in its plane. The two backs of each of these end member pairs 24a, 24b lie in close contact with the opposite sides of the circular saw blade 15, and are rigidly adjustable in a direction towards the saw blade 15.

The workpiece W which is to be cut which, for example, is a thick steel plate, lies on the workpiece table plate 3a, 3b and is held fast opposite thereto through intermediary of clamping plates 10 and 28 which are located at the ends of the piston rods 9a, respectively 27a, of pistons 9 and, respectively 27, the latter of which are movable within the hydraulic cylinders 8, respectively 26, and which are rigidly connected to the beam 5 or, respectively 25.

The horizontal feed movement of the saw blade 15 is carried out by means of a gear wheel 11 which is driven by a suitable motor (not shown), which is seated in a housing 12 connected with the carriage 6 and engages with a gear rack 7 on the beam 5.

Figure 1:
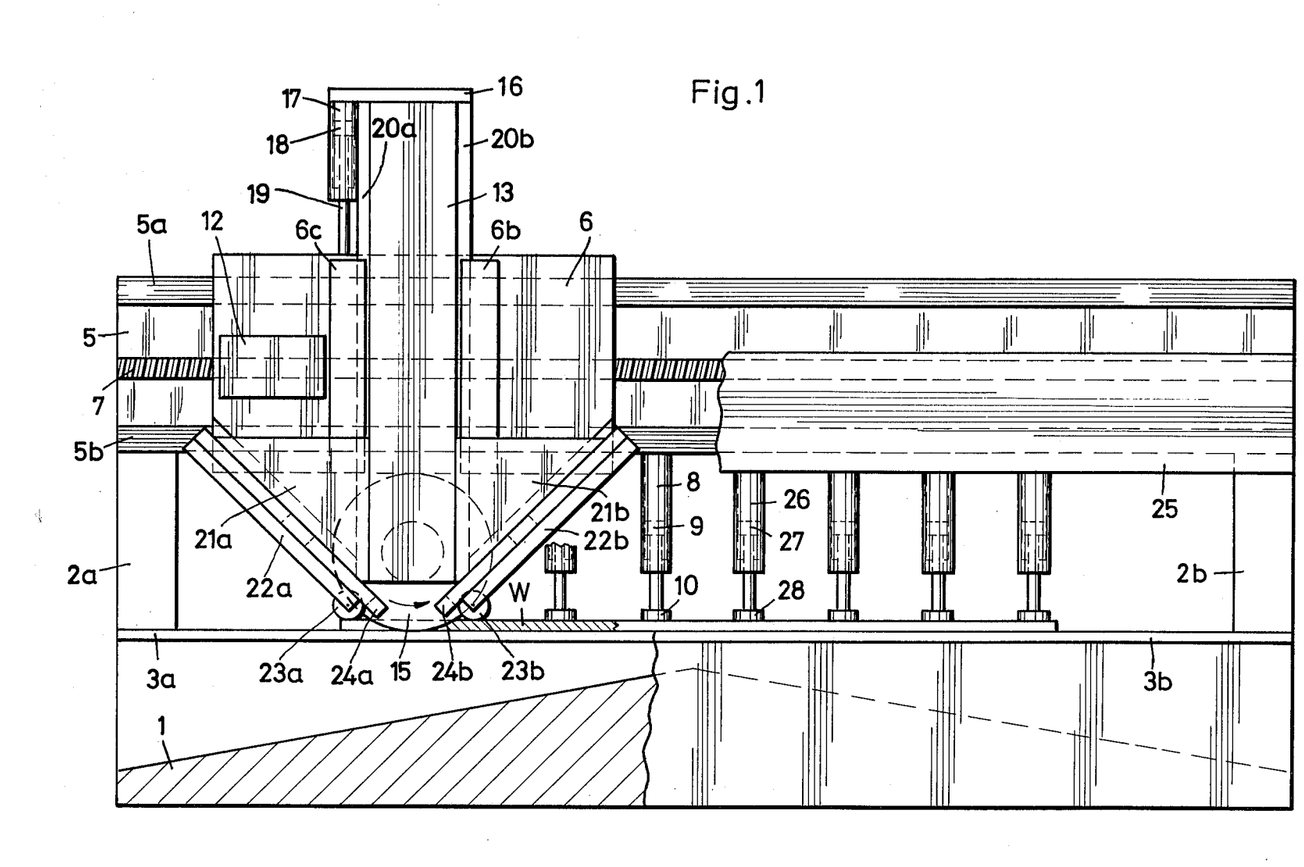
FIG. 1 shows a side elevational view, partly in section, of a machine which is constructed pursuant to the present invention.
Figure 2:
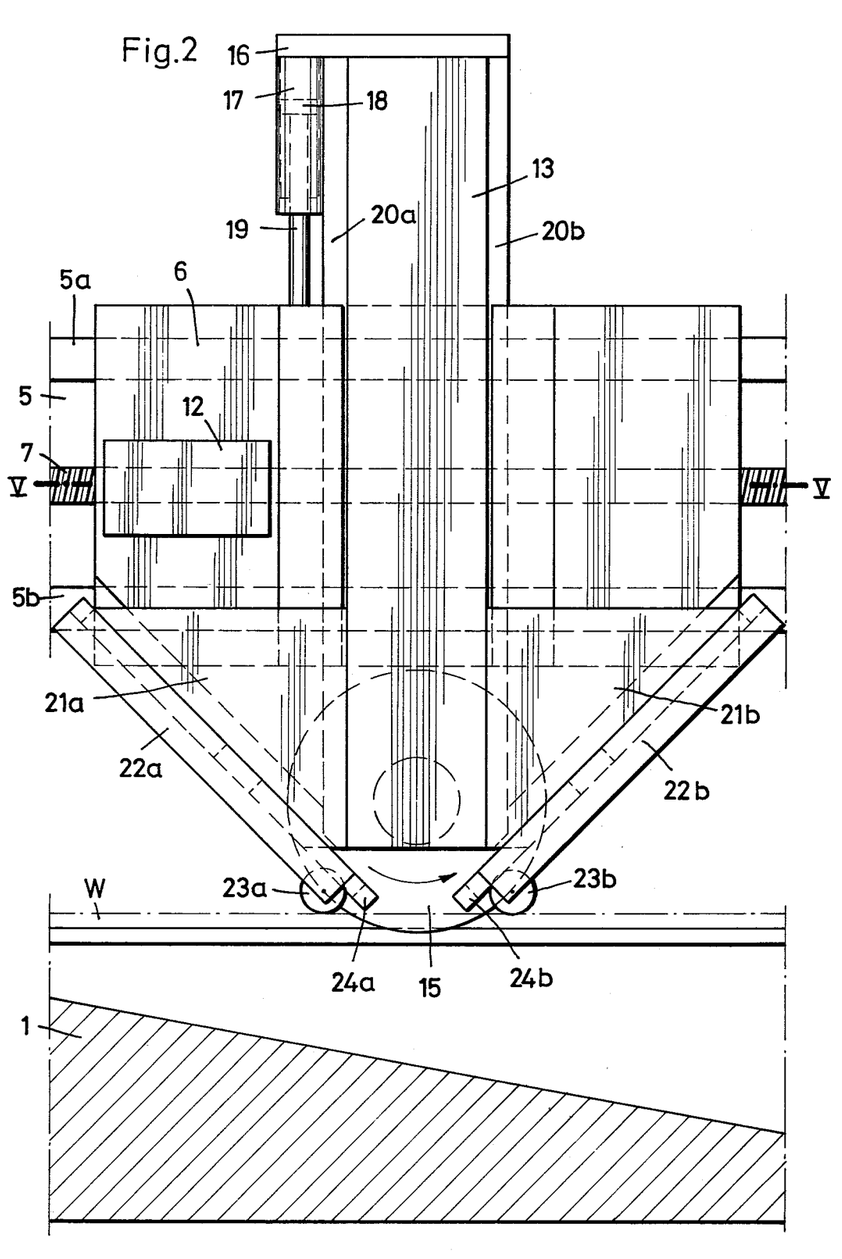
FIG. 2 illustrates, on an enlarged scale, a side elevational view of the horizontally displaceable carriage of the machine of FIG. 1.
Figure 3:
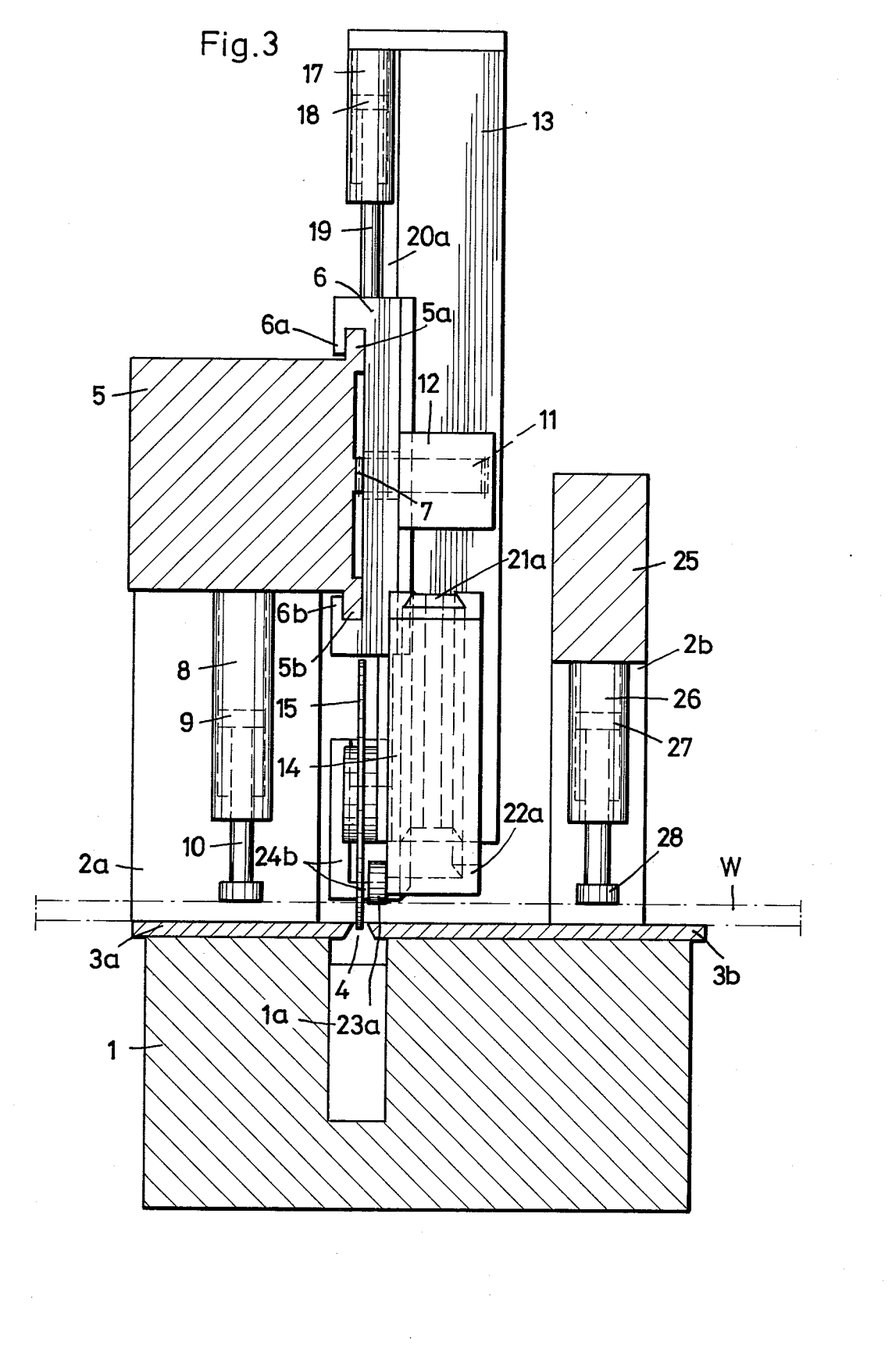
FIG. 3 shows a vertical section taken along line III-III in FIG. 4.
Figure 4:
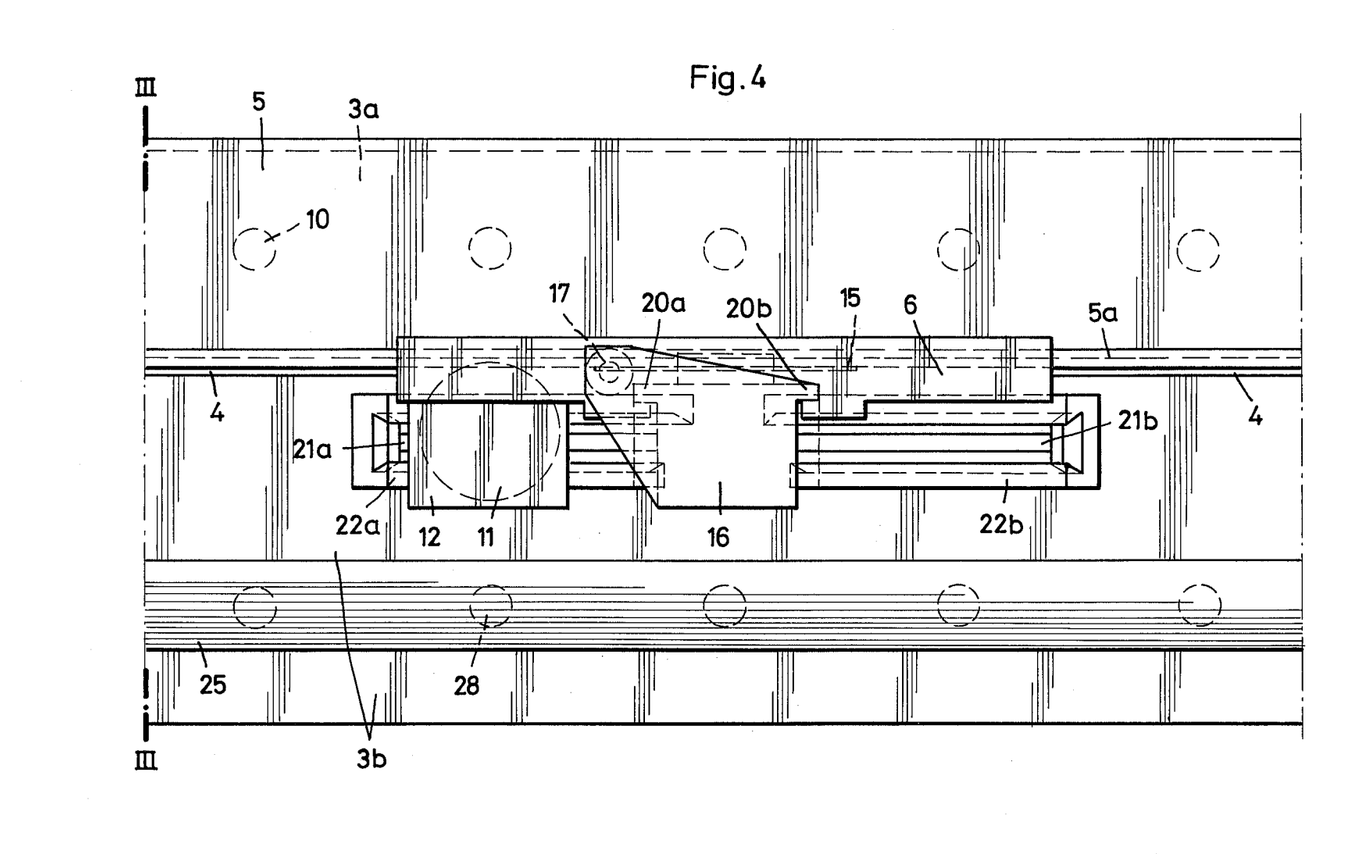
FIG. 4 illustrates a top plan view of the machine of FIG. 1.
Figure 5:
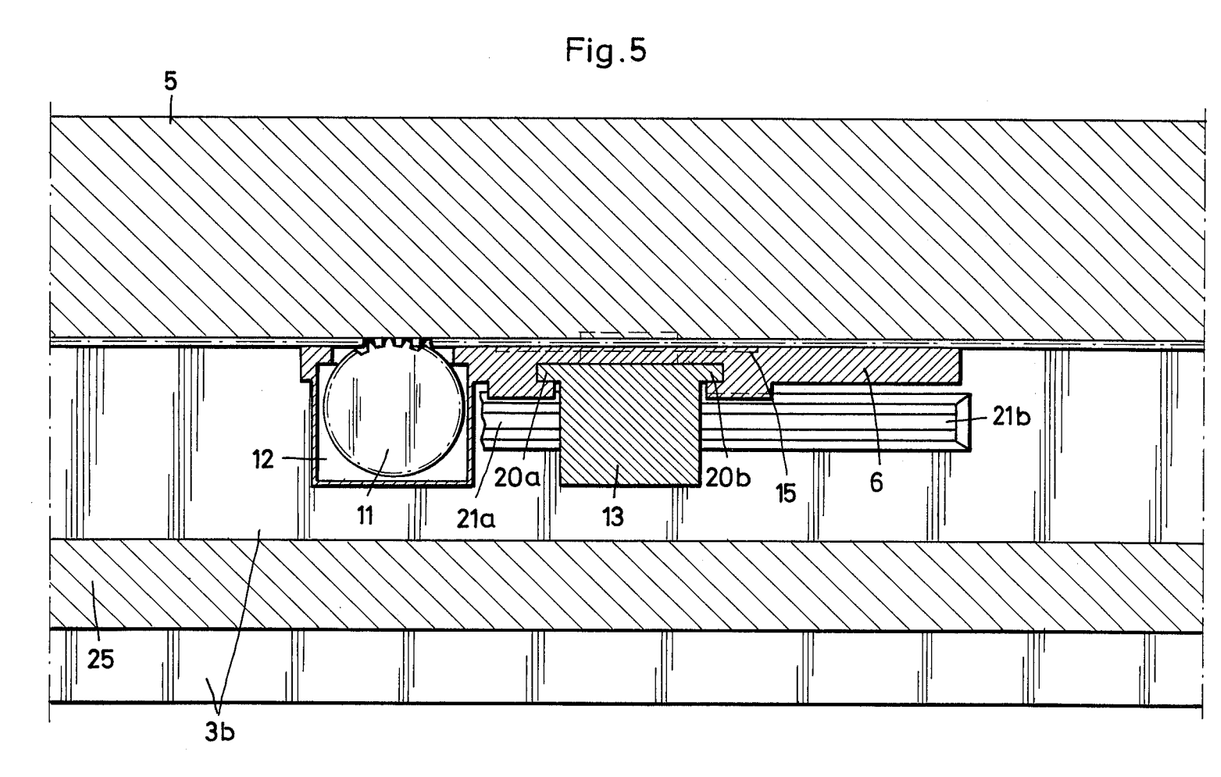
FIG. 5 illustrates a section taken along line V-V in FIG. 2.
Figure 6:
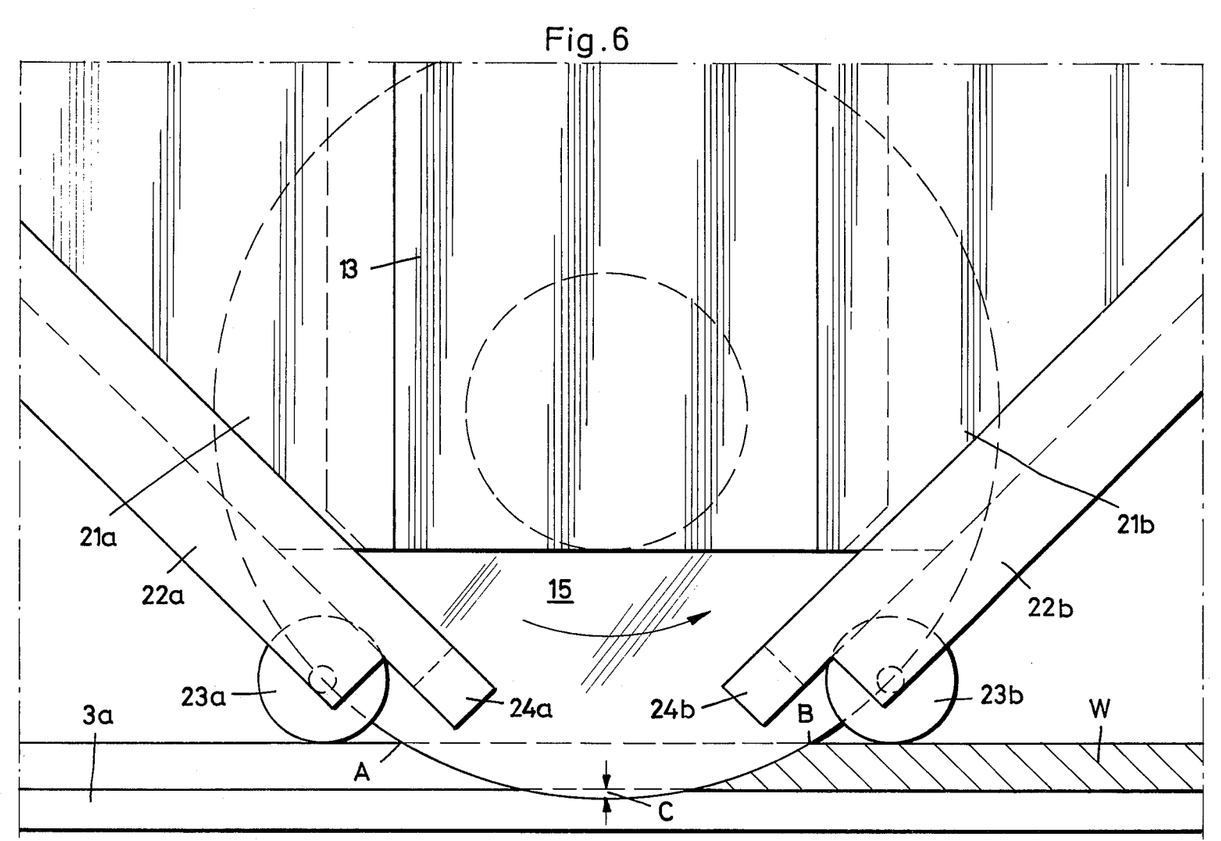
FIGS. 6 and 7, respectively illustrate, on an enlarged scale, two side views of different vertical positions of the saw blade with regard to differently thick workpieces.
Figure 7:
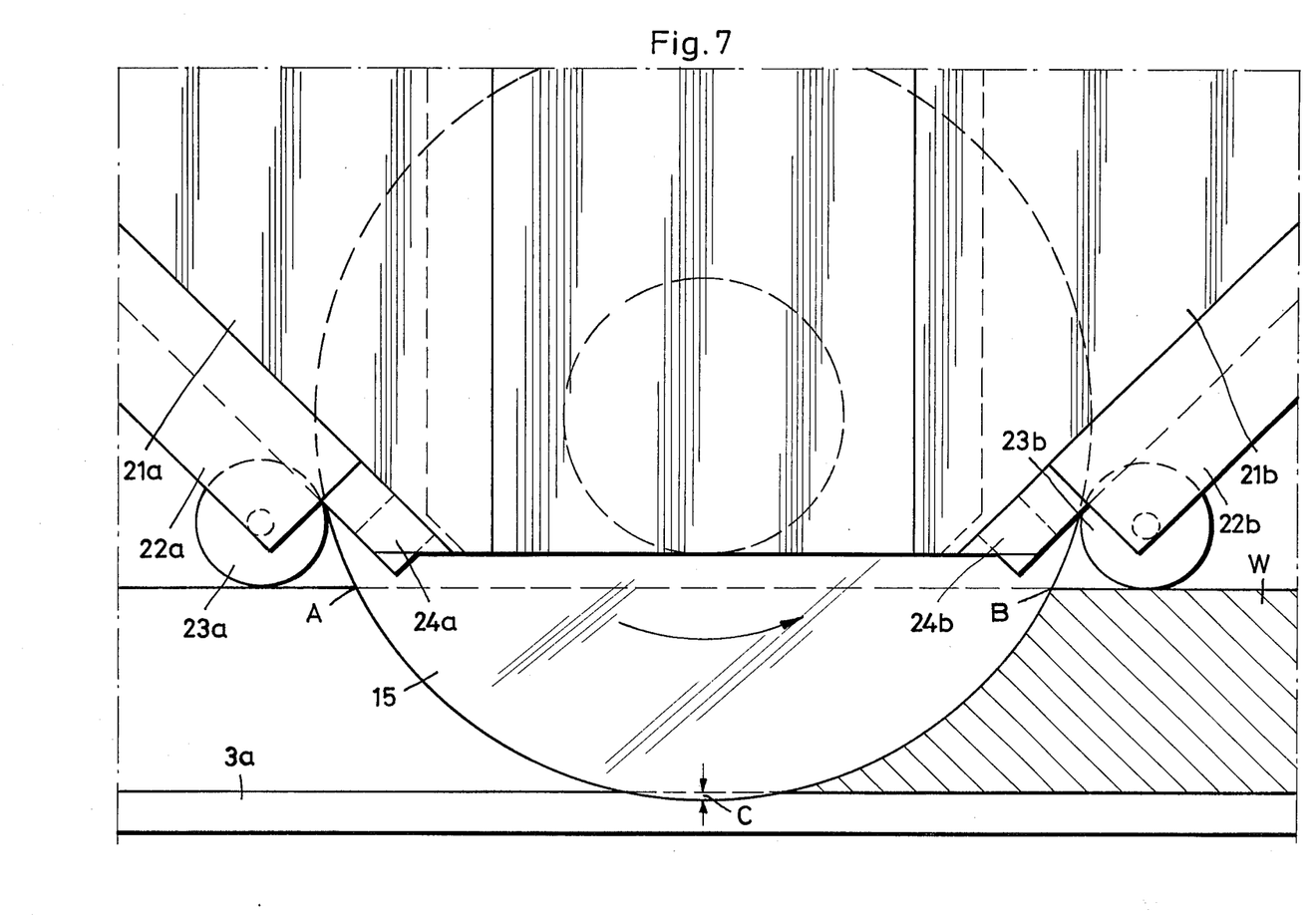

By means of the hydraulically actuated piston 18, through which the column 13 moves downwardly relative to the carriage 6, the saw blade may be so adjusted in a vertical direction and thereby in conformance with the thickness of the workpiece, so as to only enter into the gap 4 to such a minor extent to thereby project downwardly beyond the plane of the surface of the workpiece plate 3a, 3b by only an amount C which consists of a fraction of a millimeter, whereby the distance between the location A at which the saw blade 15 has fully cut through or separated the workpiece W, and the location B at which the saw blade 15 exits from the workpiece W, is as short as possible. In FIGS. 6 and 7 of the drawings, the amount C is shown on an exaggerated scale, so as to be more clearly ascertainable. In the event that the workpiece is upwardly warped or arched at various locations thereof, as is shown in FIG. 2 at $W_1$, then the column 13, together with the saw blade 15 and its drive 14, is raised by means of the rollers 23a, 23b which run along the upper surface of the workpiece W in correspondence with the height of the bulge $W_1$. Thereby is assured that the saw blade 15 will cut into the workpiece W at all locations of the workpiece with the same low depth.

Figure 8:
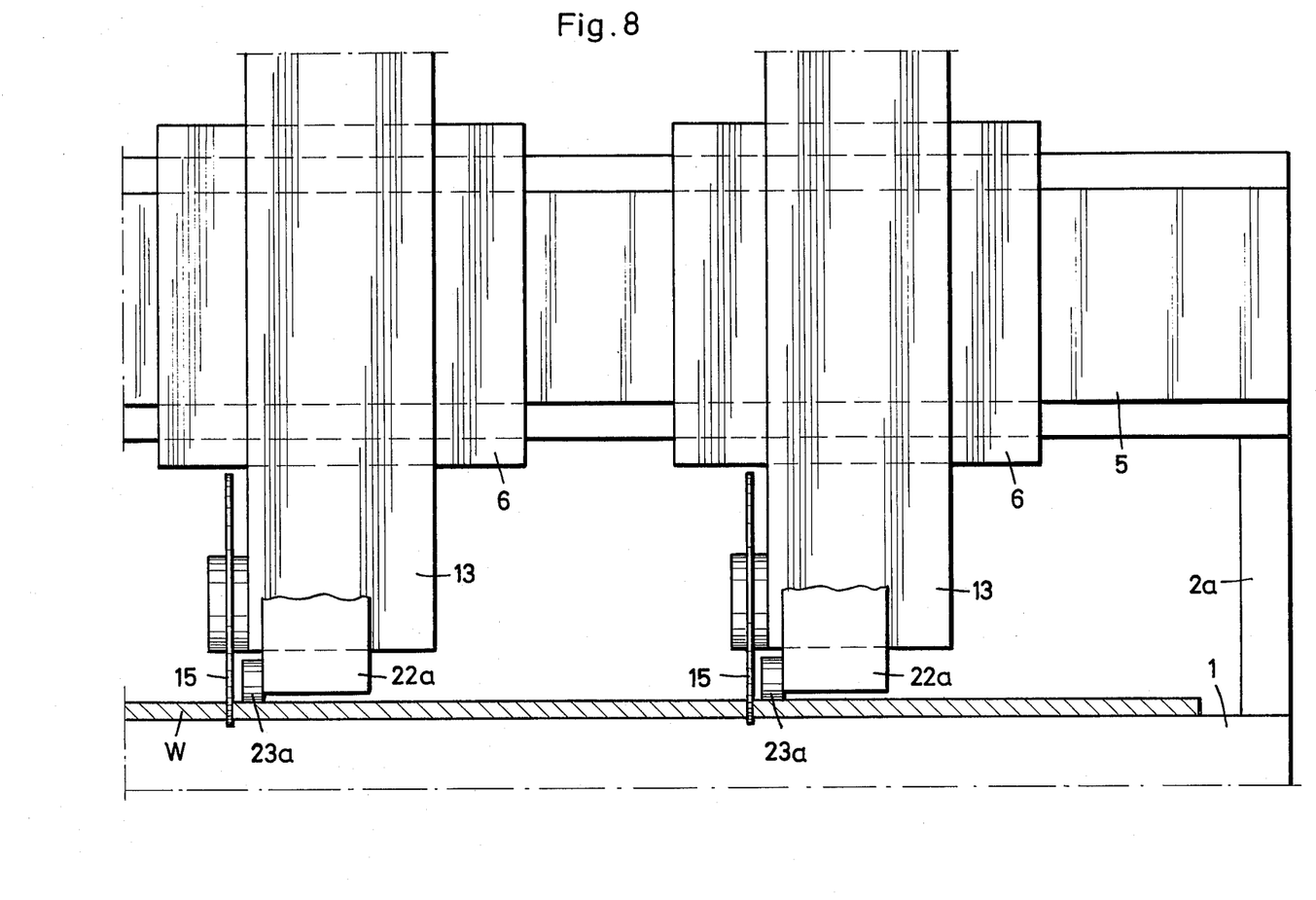
FIG. 8 illustrates an arrangement constituted of two saw units having saw blades extending in mutually parallel planes.

The machine which is illustrated in FIG. 8 of the drawings is distinct from that of the machine shown in FIGS. 1 through 7 in that two carriages 6 are guided on the beam 5, whereby the saw units are displaced by an angle of 90°, so that the saw blades 15 extend in planes which are located at right angles to the longitudinal direction of the beam 5, and in which the workpiece W is moved ahead with respect to the machine frame 1, whereas the axes of the saw blades are fixed with respect to the machine frame 1. Such a machine is particularly suitable for trimming or edging a steel plate, or to cut a plurality of webs of constant width from such a steel plate. In lieu of two saws operating in parallel with each other, there may also be provided a greater number of such saws.

While there has been shown what is considered to be the preferred embodiment of the invention, it will be obvious that modifications may be made which come within the scope of the disclosure of the specification.

What is claimed is:

1. In a machine for cold-sawing metal workpieces such as a steel plate, an arrangement comprising: a horizontal plate for supporting the workpiece, horizontal guiding means at a distance above said horizontal plate, a carriage slidable on said horizontal guiding means, means for moving said carriage on said guiding means, vertical guiding means fixed on said carriage, a cold-metal saw unit slidable on said vertical guiding means, said saw unit comprising a housing having therein a shaft of a rotary circular saw blade and gearing means for driving said shaft, means contacting the surface of said workpiece in an immediate proximity to a cut formed in said workpiece by said saw blade and supporting said saw unit housing in a vertical direction on said vertical guiding means, said contacting means being adjustable in a vertical direction relative to said saw unit, one said contacting means being arranged closely ahead of the location at which said saw blade enters said workpiece and another said contacting means being arranged closely behind said location.

2. A machine as claimed in claim 1, compising contacting members extending at an incline relative to the vertical, said contacting means being each adjustably supported on said contacting members.

3. A machine as claimed in claim 1, comprising a plurality of said saw units having a plurality of mutually parallel extending spaced saw blades.

4. A machine as claimed in claim 1, wherein said contacting means comprises rollers supported on the surface of said workpiece and rigidly connected with said saw unit.

5. A machine as claimed in claim 1 wherein said contacting means comprises pressure guides supported on the surface of said workpiece and rigidly connected with said saw unit.

* * * * *